(12) United States Patent
Endo

(10) Patent No.: US 11,890,897 B2
(45) Date of Patent: *Feb. 6, 2024

(54) PNEUMATIC TIRE

(71) Applicant: The Yokohama Rubber Co., LTD., Tokyo (JP)

(72) Inventor: Toyoaki Endo, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 490 days.

This patent is subject to a terminal disclaimer.

(21) Appl. No.: 17/042,041

(22) PCT Filed: Mar. 26, 2019

(86) PCT No.: PCT/JP2019/012645
§ 371 (c)(1),
(2) Date: Sep. 25, 2020

(87) PCT Pub. No.: WO2019/189048
PCT Pub. Date: Oct. 3, 2019

(65) Prior Publication Data
US 2021/0016605 A1    Jan. 21, 2021

(30) Foreign Application Priority Data
Mar. 26, 2018 (JP) .............................. 2018-057686

(51) Int. Cl.
*B60C 11/03* (2006.01)
*B60C 11/12* (2006.01)
*B60C 11/13* (2006.01)

(52) U.S. Cl.
CPC ........ *B60C 11/0304* (2013.01); *B60C 11/124* (2013.01); *B60C 11/1204* (2013.01);
(Continued)

(58) Field of Classification Search
CPC ............ B60C 11/1204; B60C 11/1236; B60C 11/1218; B60C 11/0304; B60C 11/1369;
(Continued)

(56) References Cited

U.S. PATENT DOCUMENTS 5,361,816 A * 11/1994 Hitzky .................... B60C 11/11
152/902
2010/0186861 A1* 7/2010 Ishiguro .............. B60C 11/1369
152/209.25
(Continued)

FOREIGN PATENT DOCUMENTS

CN    107000492      8/2017
DE    10311430 A1 *  9/2004
(Continued)

OTHER PUBLICATIONS

Machine translation for Japan 2012-140091 (Year: 2023).*
(Continued)

*Primary Examiner* — Steven D Maki
(74) *Attorney, Agent, or Firm* — Thorpe North & Western

(57) ABSTRACT

A tread pattern of a pneumatic tire includes circumferential main grooves, a land portion defined by the circumferential main grooves in the lateral direction, and sipes at intervals in a circumferential direction, the sipes connecting the circumferential main grooves with each other. Each of the sipes has a peak-like shape protruding to a first side in the circumferential direction. When, in a profile cross-section of the tread portion taken along the lateral direction, an arc passing through two land portion edge points at which a tread surface of the land portion is connected with groove wall surfaces of the circumferential main grooves and having a center point positioned on the equator line is set to a standard profile line, a profile line formed by the tread
(Continued)

surface of the land portion is a swelling profile line protruding outward of the standard profile line in a radial direction.

15 Claims, 7 Drawing Sheets

(52) U.S. Cl.
CPC ...... *B60C 11/1218* (2013.01); *B60C 11/1236* (2013.01); *B60C 11/13* (2013.01); *B60C 11/1369* (2013.01); *B60C 11/1376* (2013.01); *B60C 2011/0367* (2013.01); *B60C 2011/0383* (2013.01); *B60C 2011/1245* (2013.01)

(58) Field of Classification Search
CPC ......... B60C 11/1376; B60C 2011/0383; B60C 2011/0367
See application file for complete search history.

(56) References Cited

U.S. PATENT DOCUMENTS

| | | | | |
|---|---|---|---|---|
| 2013/0000805 | A1* | 1/2013 | Oodaira | B60C 11/1263 152/209.1 |
| 2016/0152090 | A1 | 6/2016 | Takemoto | |
| 2017/0166014 | A1 | 6/2017 | Takemoto | |
| 2017/0361659 | A1 | 12/2017 | Yamakawa | |
| 2018/0086147 | A1* | 3/2018 | Morii | B60C 11/12 |
| 2019/0315161 | A1* | 10/2019 | Balini | B60C 11/0306 |
| 2020/0031171 | A1* | 1/2020 | Fujioka | B60C 11/0306 |
| 2021/0039441 | A1* | 2/2021 | Horiuchi | B60C 11/0304 |
| 2021/0061019 | A1 | 3/2021 | Endo | |

FOREIGN PATENT DOCUMENTS

| | | | |
|---|---|---|---|
| DE | 11 2018 006 716 | | 9/2020 |
| DE | 11 2019 000 697 | | 10/2020 |
| JP | 06-239110 A | * | 8/1994 |
| JP | 2004-217058 A | * | 8/2004 |
| JP | 2007-022361 A | * | 2/2007 |
| JP | 2009-161001 A | * | 7/2009 |
| JP | 2010-126046 A | * | 6/2010 |
| JP | 2012-140091 A | * | 7/2012 |
| JP | 2013-244907 | | 12/2013 |
| JP | 2014-162250 | | 9/2014 |
| JP | 2014-181021 | | 9/2014 |
| JP | 2015-044587 | | 3/2015 |
| JP | 2015-182680 | | 10/2015 |
| JP | 2016-101802 | | 6/2016 |
| JP | 2017-105361 | | 6/2017 |
| WO | WO 2016/088621 | | 6/2016 |
| WO | WO 2019/131837 | | 7/2019 |
| WO | WO 2019/156095 | | 8/2019 |

OTHER PUBLICATIONS

Machine translation for Japan 2010-126046 (Year: 2023).*
Machine translation for Japan 2009-161001 (Year: 2023).*
Partial translation for Japan 2009-161009 (Year: 2023).*
Machine translation for Japan 2007-022361 (Year: 2023).*
Machine translation for Japan 2004-217058 (Year: 2023).*
Machine translation for Japan 06-239110 (Year: 2023).*
Machine translation for German 10311430 (Year: 2023).*
International Search Report for International Application No. PCT/JP2019/012645 dated Jun. 25, 2019, 4 pages, Japan.

* cited by examiner

PNEUMATIC TIRE

TECHNICAL FIELD

The present technology relates to a pneumatic tire.

BACKGROUND ART

In the related art, in a tread pattern of a pneumatic tire, a plurality of circumferential main grooves, which extend in a tire circumferential direction, and lug grooves and sipes, which transect land portions defined in a tire lateral direction by two circumferential main grooves, are provided. An all-season pneumatic tire, widely used in North America and Europe, (hereinafter referred to as an all-season tire) is positioned as a tire intermediate between a regular, what is called a summer tire used during non-snow seasons, and a snow tire referred to as a winter tire. For the all-season tire, excellent control performance and braking and driving performance on snow-covered road surfaces (snow performance) are demanded. Thus, for the purpose of increasing edge components, a number of sipes and lug grooves are provided in addition to the circumferential main grooves.

For example, there has been known a pneumatic tire improving uneven wear resistance of a center portion in a tread lateral direction while ensuring performance on snow (Japan Unexamined Patent Publication No. 2013-244907).

The pneumatic tire includes: a center circumferential main groove that is formed in a center portion of a tread in a tire lateral direction and that extends in a tire circumferential direction; outer circumferential main grooves that are formed outward of the center circumferential main groove in the tread and formed adjacent to the center circumferential main groove and that extend in the tire circumferential direction; lateral main grooves that are formed in the tread, extend in a direction crossing the tire circumferential direction, communicate with the center circumferential main groove and the outer circumferential main grooves, and have a groove depth with respect to a tread surface as a reference, which is deeper than a groove depth of the center circumferential main groove and shallower than a groove depth of the outer circumferential main grooves; and center blocks that are defined by the center circumferential main groove, the outer circumferential main grooves, and the lateral main grooves. Further, in a groove bottom of the center circumferential main groove, a sipe is provided.

With edges of the center blocks formed by the lateral main grooves, performance on snow can be ensured for the pneumatic tire described above. Further, the lateral main grooves communicate with the center circumferential main groove and the outer circumferential main grooves. The groove depth of the lateral main grooves is set to be shallower than the groove depth of the outer circumferential main grooves, and the groove depth of the center circumferential main groove is set to be shallower than that of the lateral main grooves. Thus, rigidity of the center blocks is ensured, and excessive deformation of the center blocks is suppressed during loaded rolling of the tire. With this, heel and toe wear of the center blocks can be suppressed. As a result, uneven wear resistance of the center portion in the tread lateral direction can be improved while ensuring performance on snow.

The pneumatic tire has excellent uneven wear resistance. However, when such tread pattern is applied to an all-season tire for a passenger vehicle, steering stability on dry road surfaces suitable for a passenger vehicle is not always exerted.

SUMMARY

In view of this, the present disclosure provides a pneumatic tire capable of improving steering stability on dry road surfaces and performance on snow with a new tread pattern that is different from the tread pattern described above.

One aspect of the present disclosure is a pneumatic tire that is provided with a tread pattern.

The tread pattern includes a pair of circumferential main grooves including an inner circumferential main groove being provided in a first half tread region on one side with respect to a tire equator line in a tire lateral direction and an outer circumferential main groove being provided outward of the inner circumferential main groove in the tire lateral direction; a land portion being defined by the pair of circumferential main grooves in the tire lateral direction; and a plurality of sipes provided at an interval in a tire circumferential direction, the plurality of sipes being provided in a region of the land portion and connecting the pair of circumferential main grooves with each other.

Each of the plurality of sipes includes a pair of inclined sipe portions approaching each other while advancing from connection ends of the pair of circumferential main grooves to a first side in the tire circumferential direction; and a sipe turning portion connecting ends of the pair of inclined sipe portions with each other and being bent to protrude to the first side, and a profile line formed by a tread surface of the land portion being a swelling profile line protruding outward of a standard profile line in a tire radial direction. When an arc passing through two land portion edge points at which the tread surface of the land portion is connected with groove wall surfaces of the pair of circumferential main grooves is set to the standard profile line, in a profile cross-section of the tread portion taken along the tire lateral direction.

Preferably, a protrusion end of the sipe turning portion, which protrudes most to the first side, is present within a range of 70% of a width of the land portion in the tire lateral direction, with a maximum swelling position of the swelling profile line as a center.

Preferably, a protrusion end of the sipe turning portion, which protrudes most to the first side, is present inward of a maximum swelling position of the swelling profile line in the tire lateral direction.

Preferably, the tread pattern includes a plurality of lug grooves provided at an interval in the tire circumferential direction, the plurality of lug grooves connecting the pair of circumferential main grooves with each other, each of the plurality of lug grooves includes: a pair of inclined groove portions approaching each other while advancing from connection ends of the pair of circumferential main grooves to the first side in the tire circumferential direction; and a groove turning portion connecting ends of the pair of inclined groove portions with each other and being bent to protrude to the first side in the tire circumferential direction, the land portion is formed of a plurality of block land portions divided by the plurality of lug grooves in the tire circumferential direction, and in a region of each of the plurality of block land portions, two of the plurality of sipes are provided as a first sipe and a second sipe.

Preferably, a protrusion end of the groove turning portion, which protrudes most to the first side, is present within a range of 70% of a width of the land portion in the tire lateral direction, with a maximum swelling position of the swelling profile line as a center.

Preferably, a protrusion end of the groove turning portion, which protrudes most to the first side, is present inward of a maximum swelling position of the swelling profile line in the tire lateral direction.

Preferably, the groove turning portion is provided with a raised groove bottom portion having a groove depth shallower than a groove depth of the pair of inclined groove portions, the first sipe is provided on the first side relative to the second sipe, and a first position of a protrusion end of the sipe turning portion of the first sipe in the tire lateral direction, which protrudes most to the first side, is present in a raised bottom portion range in the tire lateral direction in which the raised groove bottom portion is provided and is present inward in the tire lateral direction relative to a second position of a protrusion end of the sipe turning portion of the second sipe in the tire lateral direction, which protrudes most to the first side.

Preferably, in the region of each of the plurality of block land portions, a region between the first sipe and the second sipe in the tire circumferential direction is provided with a third sipe having a terminal end in the raised bottom portion range in the tire lateral direction, the third sipe extending, at an inclination with respect to the tire lateral direction, outward in the tire lateral direction from the inner circumferential main groove, along at least one of the pair of inclined sipe portions of the first sipe and the second sipe extending from the inner circumferential main groove.

Preferably, a maximum protruding amount of the swelling profile line with respect to the standard profile line falls within a range of from 0.1 mm to 1.0 mm.

Preferably, when the land portion is a first intermediate land portion, the tread pattern further includes a first side land portion outward of the outer circumferential main groove in the tire lateral direction, the first side land portion including a ground contact edge of the pneumatic tire in a region, a region of the first side land portion is provided with a sixth sipe connected with the outer circumferential main groove, each of the first sipe, the second sipe, and the sixth sipe is a composite sipe including: a straight sipe having a shape extending linearly from the tread surface in a sipe depth direction; and a wave-like sipe being bent or curved to protrude in a direction orthogonal to the sipe depth direction and an extension direction in which each of the first sipe, the second sipe, and the sixth sipe extends along the tread surface, when advancing from the tread surface in the sipe depth direction, the straight sipe is provided on one side in a sipe extension direction viewed from the tread surface, and the wave-like sipe is provided on an other side in the sipe extension direction, the straight sipe and the wave-like sipe are connected in the composite sipe, and each of parts of the first sipe, the second sipe, and the sixth sipe, which are connected with the outer circumferential main groove, is the wave-like sipe.

Preferably, when the inner circumferential main groove is a first inner circumferential main groove, and the outer circumferential main groove is a first outer circumferential main groove, a second half tread region on a side opposite to the first half tread region in the tire lateral direction includes: a second inner circumferential main groove; a second outer circumferential main groove being provided outward of the second inner circumferential main groove in the tire lateral direction; a continuous land portion being defined by the second inner circumferential main groove and the second outer circumferential main groove and present around a circumference in the tire circumferential direction; and a fourth sipe and a fifth sipe connecting the second inner circumferential main groove and the second outer circumferential main groove with each other, the fourth sipe and the fifth sipe extending to be inclined with respect to the tire lateral direction in a region of the continuous land portion, each of the fourth sipe and the fifth sipe includes: an inner inclined portion provided in a region of the continuous land portion; and both side inclined portions being provided on both sides of the inner inclined portion in the tire lateral direction and being connected with the second inner circumferential main groove and the second outer circumferential main groove, the inner inclined portion of the fourth sipe and the inner inclined portion of the fifth sipe are parallel with each other, and an inclination angle of the inner inclined portion with respect to the tire lateral direction is larger than an inclination angle of both the side inclined portions with respect to the tire lateral direction.

Preferably, when the continuous land portion is a second intermediate land portion, the tread pattern further includes a second side land portion being provided outward of the second outer circumferential main groove in the tire lateral direction, the second side land portion including a ground contact edge of the pneumatic tire in a region thereof, a region of the second side land portion is provided with a seventh sipe connected with the second outer circumferential main groove, each of the fourth sipe, the fifth sipe, and the seventh sipe is a composite sipe including: a straight sipe having a shape extending linearly from the tread surface in the sipe depth direction; and a wave-like sipe being bent or curved to protrude in a direction orthogonal to the sipe depth direction and an extension direction in which each of the fourth sipe, the fifth sipe, and the seventh sipe extends along the tread surface, when advancing from the tread surface in the sipe depth direction, the straight sipe is provided on one side in the extension direction, and the wave-like sipe is provided on an other side in the extension direction, the straight sipe and the wave-like sipe are connected in the composite sipe, and each of parts of the fourth sipe, the fifth sipe, and the seventh sipe, which are connected with the second outer circumferential main groove, is the wave-like sipe.

Preferably, when the inner circumferential main groove is a first inner circumferential main groove, and the outer circumferential main groove is a first outer circumferential main groove, in the tread pattern, a second half tread region on a side opposite to the first half tread region in the tire lateral direction includes: a second inner circumferential main groove; a second outer circumferential main groove being provided outward of the second inner circumferential main groove in the tire lateral direction; a center continuous land portion being defined by the first inner circumferential main groove and the second inner circumferential main groove and present around a circumference in the tire circumferential direction; a plurality of first center lug grooves being provided at an interval in the tire circumferential direction, the plurality of first center lug grooves extending inward in the tire lateral direction from the first inner circumferential main groove and being terminated in a region of the center continuous land portion; and a plurality of second center lug grooves being provided at an interval in the tire circumferential direction, the plurality of second center lug grooves extending inward in the tire lateral direction from the second inner circumferential main groove and being terminated in a region of the center continuous land portion, any one of the plurality of second center lug grooves is provided in a region in the tire circumferential direction between two first center lug grooves adjacent to each other in the tire circumferential direction among the plurality of first center lug grooves, and any one of the plurality of first center lug grooves is provided in a region in the tire circumferential direction between two second center lug grooves adjacent to each other in the tire circumferential direction among the plurality of second center lug grooves.

Preferably, a maximum groove depth of the plurality of second center lug grooves is shallower than a maximum groove depth of the plurality of first center lug grooves.

Preferably, the pneumatic tire is designated to have one side of both sides in the tire lateral direction, the one side being a vehicle outer side when the pneumatic tire is mounted to a vehicle, and a side in the tire lateral direction, which is provided with the first half tread region, is designated to be the vehicle outer side.

Preferably, a shoulder lug groove is provided outward of the outer circumferential main groove in the first half tread region in the tire lateral direction, the tread pattern includes, in a second half tread region on a side opposite to the first half tread region in the tire lateral direction, a second inner circumferential main groove; a second outer circumferential main groove being provided outward of the second inner circumferential main groove in the tire lateral direction; and a shoulder lug groove provided outward of the second outer circumferential main groove in the tire lateral direction, and a groove area ratio in a region outward of the outer circumferential main groove in the first half tread region in the tire lateral direction is smaller than a groove area ratio in a region outward of the second outer circumferential main groove in the tire lateral direction.

According to the pneumatic tire described above, steering stability on dry road surfaces and performance on snow can be improved.

DETAILED DESCRIPTION

Now, a pneumatic tire according to an embodiment of the present disclosure is described below in detail with reference to the accompanying drawings.

The pneumatic tire according to an embodiment described below is applied to an all-season tire for a passenger vehicle and may also be applied to an all-season tire for a small truck, or an all-season tire for a bus and a truck.

Herein, "tire lateral direction" is the direction parallel with the rotation axis of the pneumatic tire. "Outward in the tire lateral direction" is the direction in the tire lateral direction away from a tire equator line CL that represents the tire equatorial plane with respect to a position of comparison. "Inward in the tire lateral direction" is the direction in the tire lateral direction toward the tire equator line CL with respect to a position of comparison. "Tire circumferential direction" is the direction in which the pneumatic tire rotates about the rotation axis of the pneumatic tire. "Tire circumferential direction" includes a first side and a second side in directions different from each other. "Tire radial direction" is the direction orthogonal to the rotation axis of the pneumatic tire. "Outward in the tire radial direction" is the direction away from the rotation axis along the tire radial direction with respect to a position of comparison. "Inward in the tire radial direction" is the direction toward the rotation axis along the tire radial direction with respect to a position of comparison.

In the following description, ground contact edges of the pneumatic tire refer to edges that are most away from the tire equator line CL in a region where a tread surface of a tread portion of the pneumatic tire comes into contact with a dry, horizontal surface, when the pneumatic tire is mounted on a regular rim, inflated to a regular internal pressure, and loaded with 70% of a regular load. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). Also, "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. "Regular load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

Tire Structure

Figure 1:
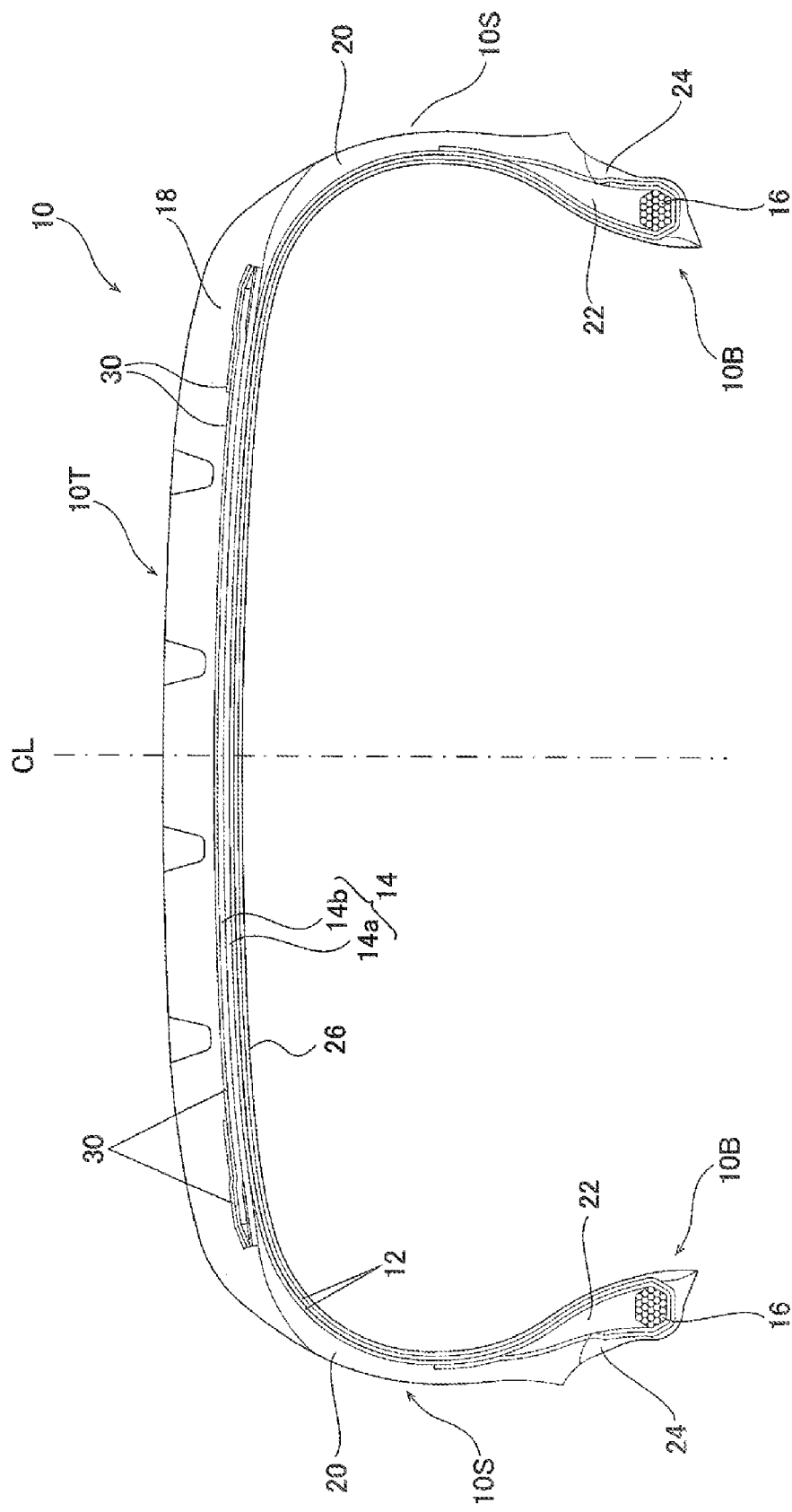
FIG. 1 is a tire cross-sectional view of a tire according to an embodiment.

FIG. 1 is a tire cross-sectional view of a tire 10 according to an embodiment. The tire 10 includes a tread portion 10T including a tread pattern, a pair of bead portions 10B, and a pair of side portions 10S provided on both sides of the tread portion 10T, connecting the pair of bead portions 10B and the tread portion 10T.

The tire 10 mainly includes: a carcass ply layer 12, a belt layer 14, and a bead core 16 as framework members or layers of framework members; and a tread rubber member 18, side rubber members 20, bead filler rubber members 22, rim cushion rubber members 24, and an innerliner rubber member 26 around the framework members.

The carcass ply layer 12 is composed of a carcass ply member that is made of organic fibers covered with rubber and that is wound between a pair of annular bead cores 16 and formed into a toroidal shape. The carcass ply member is wound around the bead cores 16 and extends outward in the tire radial direction. The belt layer 14 is provided outward of the carcass ply layer 12 in the tire radial direction, and is composed of two belt members 14a, 14b. The belt layer 14 is a member composed of rubber-covered steel cords. The steel cords are disposed inclined at a predetermined angle of, for example, from 20 to 30 degrees with respect to the tire circumferential direction. A width in the tire lateral direction of the lower layer belt member 14a is greater than that of the upper layer belt member 14b. The inclination direction of the steel cords of the two belt members 14a and 14b are opposite to each other with respect to the tire equator line CL. As such, the belt members 14a, 14b are crossing layers suppressing expansion of the carcass ply layer 12 due to the pressure of the air in the tire.

The tread rubber member 18 is disposed outward of the belt layer 14 in the tire radial direction. Both end portions of the tread rubber member 18 are connected to the side rubber members 20 to form the side portions 10S. The rim cushion rubber members 24 are provided at the inner ends of the side rubber members 20 in the tire radial direction and come into contact with a rim on which the tire 10 is mounted. The bead filler rubber members 22 are provided outward of the bead cores 16 in the tire radial direction so as to be interposed between a portion of the carcass ply layer 12 before being wound around the bead cores 16 and a portion of the carcass ply layer 12 after being wound around the bead cores 16. The innerliner rubber member 26 is provided on the inner surface of the tire 10 facing a tire cavity region that is filled with air and is surrounded by the tire 10 and the rim.

In addition, the tire 10 includes two belt cover layers 30 formed of organic fibers or steel cords covered with rubber, the belt cover layers 30 covering the belt layer 14 from an outer side in the tire radial direction of the belt layer 14. Also, the tire 10 may include a bead reinforcing member between the carcass layer 12 wound around the bead core 16 and the bead filler rubber member 22.

The tire structure of the present embodiment is as described above. However, the tire structure is not particularly limited and a known tire structure is applicable.

Tread Pattern

Figure 2:
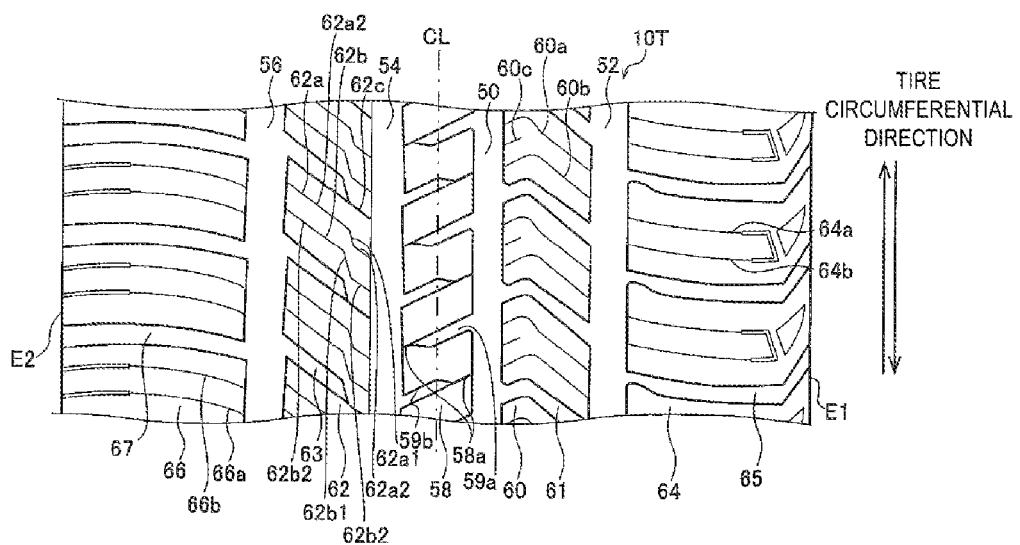
FIG. 2 is an explanatory view of a tread pattern of an embodiment.

FIG. 2 is an explanatory view of an example of the tread pattern of an embodiment. The tread pattern illustrated in FIG. 2, which is described below, is an asymmetric pattern with respect to the tire equator line CL and may not necessarily be a symmetric pattern. For example, a point symmetric pattern may be obtained by combining a tread pattern on a right side of an inner circumferential main groove 54 in FIG. 2 with a tread pattern, in which a part of the tread pattern outward of an inner circumferential main groove 50 in the tire lateral direction is reversed by 180 degrees (rotated upside down) on the paper sheet in FIG. 2 and then is disposed in a part on a left side of the inner circumferential main groove 54 on the left side of the tire equator line CL.

As illustrated in FIG. 2, the tread pattern of the tread portion 10T mainly includes: the inner circumferential main grooves 50 and 54, outer circumferential main grooves 52 and 56, a center continuous land portion 58, intermediate land portions 60 and 62, side land portions 64 and 66, and lug grooves 59a, 59b, 61, 63, 65, and 67.

Note that, among the two types of circumferential main grooves that respectively define the intermediate land portions 60 and 62 provided both sides in the tire lateral direction across the tire equator line CL as a boundary, the inner circumferential main grooves 50 and 54 are not necessarily required to be provided on one side in the tire lateral direction. Specifically, in an embodiment, the inner circumferential main grooves 50 and 54 may be provided as one groove on the tire equator line CL, and one of the two types of circumferential main grooves defining the intermediate land portions 60 and 62 may be shared as one inner circumferential main groove, that is, three circumferential main grooves may be provided.

On both sides in the tire lateral direction across the tire equator line (tire center line) CL as a boundary, the tread portion 10T includes: the intermediate land portion 60 defined by the inner circumferential main groove 50 and the outer circumferential main groove 52 in the tire lateral direction; and the intermediate land portion 62 defined by the inner circumferential main groove 54 and the outer circumferential main groove 56 in the tire lateral direction. Further, the tread portion 10T includes the side land portions 64 and 66 that are in contact with the outer circumferential main grooves 52 and 56, are formed outward of the outer circumferential main grooves 52 and 56 in the tire lateral direction, and include the ground contact edges of the pneumatic tire 10 within regions thereof.

The inner circumferential main grooves 50 and 54 are positioned inward of the outer circumferential main grooves 52 and 56 in the tire lateral direction (on the side close to the tire equator line CL) and are disposed to be in contact with the center land portion 58 so as to define the center land portion 58.

The outer circumferential main grooves 52 and 56 are positioned outward of the inner circumferential main grooves 50 and 54 in the tire lateral direction and are disposed to be in contact with the intermediate land portion 60 and the intermediate land portion 62 so as to define the intermediate land portion 60 and the intermediate land portion 62 together with the inner circumferential main grooves 50 and 54. The intermediate land portion 60 are defined by the lug groove 61 in the tire circumferential direction and forms a plurality of block land portions. The intermediate land portion 60 and the side land portions 64 and 66 are block land portions obtained by arranging a plurality of block land portions, which are defined by the lug grooves in the tire circumferential direction, at an interval in the tire circumferential direction. Each of the center land portion 58 and the intermediate land portion 62 is a substantially continuous land portion extending continuously so that the land portion is present around the tire circumference in the tire circumferential direction. The substantially continuous land portion refers to a land portion that is not divided by a lug groove in the tire circumferential direction. In the substantially continuous land portion, a sipe may be connected to the circumferential main grooves on both sides in the tire lateral direction. Hereinafter, the substantially continuous land portion is referred to as a continuous land portion.

Specifically, the center land portion 58, the lug groove 59a (first center lug grooves), and the lug groove 59b (second center lug grooves) are provided between the inner circumferential main groove 50 (first inner circumferential main groove) and the inner circumferential main groove 54 (second inner circumferential main groove). Hereinafter, the lug grooves 59a and 59b are also referred to as the center lug grooves 59a and 59b.

The center land portion 58 is a continuous land portion that is defined by the inner circumferential main groove 50 and the inner circumferential main groove 54 and is present around the circumference in the tire circumferential direction. The center lug groove 59a extends inward from the inner circumferential main groove 50 in the tire lateral direction and is terminated in a region of the center land portion 58. The center lug groove 59b extends inward from the inner circumferential main groove 54 in the tire lateral direction and is terminated in the region of the center land portion 58. A plurality of the center lug grooves 59a and a plurality of the center lug grooves 59b are provided at an interval in the tire circumferential direction. One center lug groove 59b is provided in a region in the tire circumferential direction between two center lug grooves 59a, which are adjacent to each other in the tire circumferential direction, and one center lug groove 59a is provided in a region in the tire circumferential direction between two center lug grooves 59b, which are adjacent to each other in the tire circumferential direction. Specifically, the lug grooves 59a extending from the inner circumferential main groove 50 and the lug groove 59b extending from the inner circumferential main groove 54 are provided alternately in the tire circumferential direction.

Sipes 58a are provided in the region of the center land portion 58. The sipe 58a communicates with a terminal end of the center lug groove 59a and the inner circumferential main groove 54 or communicates with a terminal end of the center lug groove 59b and the inner circumferential main groove 50.

The intermediate land portion 60 and the lug groove 61 are provided between the inner circumferential main groove 50 (the first inner circumferential main groove) and the outer circumferential main groove 52 (the first outer circumferential main groove), which are provided in a half tread region on the right side of the tire equator line CL in FIG. 2.

A plurality of the lug grooves 61 are provided at an interval in the tire circumferential direction.

The intermediate land portion 60 is formed a plurality of block land portions that are defined by the inner circumferential main groove 50 and the outer circumferential main groove 52 in the tire lateral direction, are defined by the lug grooves 61 in the tire circumferential direction, and are aligned in the tire circumferential direction.

The lug grooves 61 communicate with the inner circumferential main groove 50 and the outer circumferential main groove 52. The plurality of lug grooves 61 are provided at an interval in the tire circumferential direction and define the intermediate land portion 60 in the tire circumferential direction. As illustrated in FIG. 2, when the tread surface is viewed from outward in the tire radial direction, the lug groove 61 has a peak-like shape, which has substantially the same groove width and protrudes to one side in the tire circumferential direction. Specifically, the lug groove 61 includes: a pair of inclined groove portions 61a1 that approach each other while advancing to the first side in the tire circumferential direction from a connection end of the inner circumferential main groove 50 and a connection end of the outer circumferential main groove 52 (see FIG. 4); and a groove turning portion 61a2 that connects ends of the pair of inclined groove portions 61a1 with each other and that turns to protrude in a peak-like shape toward the first side in the tire circumferential direction (see FIG. 4). As illustrated in FIG. 2, a protrusion end of the peak-like shape is offset inward in the tire lateral direction with respect to a center line of the intermediate land portion 60 in the tire lateral direction. In a region of the intermediate land portion 60, sipes 60a, 60b, and 60c are provided. The sipes 60a and 60b connect the inner circumferential main groove 50 and the outer circumferential main groove 52 with each other. Similarly to the lug groove 61, when the tread surface is viewed from outward in the tire radial direction, the sipes 60a and 60b extend to have a peak-like shape protruding to one side in the tire circumferential direction and to be parallel with the lug groove 61. Specifically, a plurality of the sipes 60a and a plurality of sipes 60b are provided at an interval in the tire circumferential direction. The sipe 60a and the sipe 60b include: a pair of inclined sipe portions 60a1 and 60a2 (see FIG. 4) and a pair of inclined sipe portions 60b1 and 60b2 (see FIG. 4), and sipe turning portions 60a3 and 60b3 (see FIG. 4), respectively. The pair of inclined sipe portions 60a1 and 60a2 and the pair of inclined sipe portions 60b1 and 60b2 approach each other while advancing to the first side (upward in FIG. 2) in the tire circumferential direction from a connection end of the inner circumferential main groove 50 and a connection end of the outer circumferential main groove 52. The sipe turning portions 60a3 and 60b3 connect the pair of inclined sipe portions 60a1 and 60a2 (see FIG. 4) and the pair of inclined sipe portions 60b1 and 60b2 (see FIG. 4), respectively, and turn to protrude to the first side. Meanwhile, the sipe 60c is provided between the sipe 60a and the sipe 60b in the tire circumferential direction, extends outward in the tire lateral direction from the inner circumferential main groove 50 in parallel with the sipe 60a and the sipe 60b in an inclined manner with respect to the tire lateral direction, and is terminated in the region of the intermediate land portion 60.

The lug groove 63 extends from the outer circumferential main groove 56 toward the inner circumferential main groove 54 and is terminated in a region of the intermediate land portion 62 without communicating with the inner circumferential main groove 54. A plurality of the lug grooves 63 are provided at an interval in the tire circumferential direction. In the region of the intermediate land portion 62, a sipe 62c that communicates with a terminal end of the lug groove 63 and the inner circumferential main groove 54 is provided from the terminal end of the lug groove 63. Further, in the region of the intermediate land portion 62 between the lug grooves 63 adjacent to each other in the tire circumferential direction, sipes 62a and 62b that connect the outer circumferential main groove 56 and the inner circumferential main groove 54 with each other are provided. The lug groove 63 and the sipes 62a, 62b, and 62c are all inclined with respect to the tire lateral direction. This inclination direction is inclined from the tire lateral direction to a different side in the tire circumferential direction, with respect to the inclination direction of the center lug grooves 59a and 59b and the sipe 58a. The sipes 62a and 62b (the fourth sipe and the fifth sipe) include: steep inclination parts 62a1 and 62b1 that are parallel with each other and are inclined steeply so that the inclination directions of the sipes 62a and 62b are close to the tire circumferential direction; and gentle inclination parts 62a2 and 62b2 that are provided on both sides of the steep inclination parts and are gently inclined with respect to the tire lateral direction. The gentle inclination parts 62a2 and 62b2 are opened to the inner circumferential main groove 54 and the outer circumferential main groove 56.

Specifically, the sipes 62a and 62b each include: an inner inclined portion provided inside the region of the intermediate land portion 62; and side inclined portions that are provided on both sides of the inner inclined portion in the tire lateral direction and that are respectively connected to the inner circumferential main groove 54 and the outer circumferential main groove 56. An inclination angle of the inner inclined portion of each of the sipes 62a and 62b with respect to the tire lateral direction is larger than an inclination angle of the side inclined portions with respect to the tire lateral direction.

The lug groove 65 extends outward in the tire lateral direction from the outer circumferential main groove 52 to a pattern end E1. A plurality of the lug grooves 65 are provided at an interval in the tire circumferential direction. Sipes 64a and 64b extending outward in the tire lateral direction from the outer circumferential main groove 52 are provided in a region of the side land portion 64 between the lug grooves 65 adjacent to each other in the tire circumferential direction.

The lug groove 67 extends outward in the tire lateral direction from the outer circumferential main groove 56 to a pattern end E2. A plurality of the lug grooves 67 are provided at an interval in the tire circumferential direction. Sipes 66a and 66b extending outward in the tire lateral direction from the outer circumferential main groove 56 are provided in a region of the side land portion 66 between the lug grooves 67 adjacent to each other in the tire circumferential direction.

The groove depths of the inner circumferential main grooves 50 and 54 and the outer circumferential main grooves 52 and 56, and the groove depths of the lug grooves 59a, 59b, 61, 63, 65, and 67 fall within a range of from 1.5 mm to 11.0 mm, for example. The groove widths of the inner circumferential main grooves 50 and 54 and the outer circumferential main grooves 52 and 56, and the groove widths of the lug grooves 59a, 59b, 61, 63, 65, and 67 fall within a range of from 1.5 mm to 17.5 mm, for example. The sipes 58a, 60a, 60b, 60c, 62a, 62b, 62c, 64a, 64b, 66a, and 66b have: a sipe depth falling within a range of, for example, from 3.0 mm to 8.0 mm; and a distance between the sipe wall surfaces falling within a range of, for example, from 0.4 mm to 1.5 mm. The dimension ranges of the sipe depth and the distance between the sipe wall surfaces are distinguished from those of the groove depth and the groove width. With this, the sipes can be distinguished from the grooves.

Figure 3:
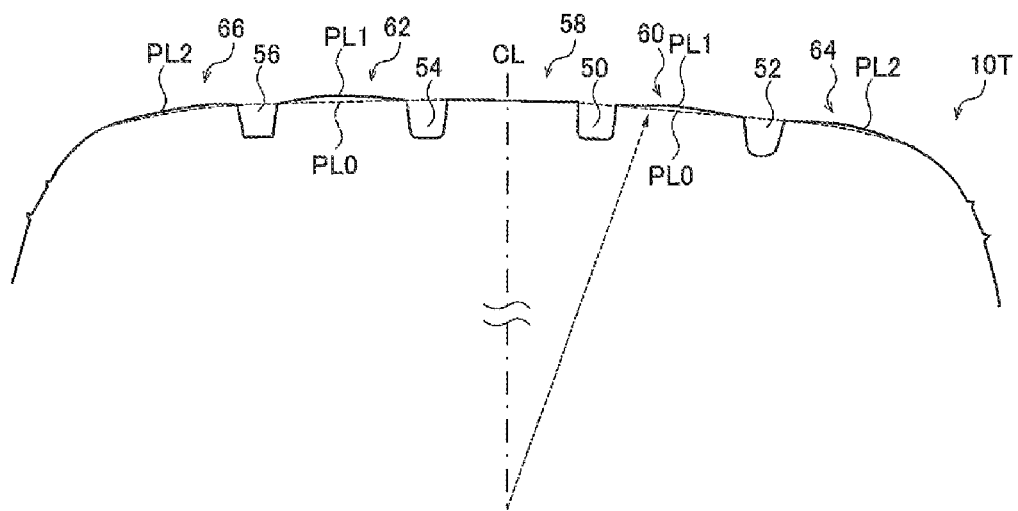
FIG. 3 is an explanatory view of profile lines formed by land portions of the tire according to an embodiment.

FIG. 3 is an explanatory view of profile lines of the tread surface, which are formed of each of the land portions of the tread pattern illustrated in FIG. 2.

As illustrated in FIG. 3, the intermediate land portions 60 and 62 and the side land portions 64 and 66 include swelling profile lines PL1 and PL2. The center land portion 58 includes a standard profile line PL0. Here, in the profile cross-section of the tread portion taken along the tire lateral direction, the standard profile line PL0 refers to an arc line. The arc line passes through at least two land portion edge points at which the intermediate land portion 60 is connected to the two circumferential main grooves (the inner circumferential main groove 50 and the outer circumferential main groove 52), and the arc line has a center point positioned on the tire equator line CL. In this case, the standard profile line PL0 may pass through one side land portion edge point at which the side land portion 64 is connected with the outer circumferential main groove 52. Further, in the profile cross-section of the tread portion taken along the tire lateral direction, the standard profile line PL0 refers to an arc line. The arc line passes through at least two land portion edge points at which the intermediate land portion 62 is connected with the two circumferential main grooves (the inner circumferential main groove 54 and the outer circumferential main groove 56), and the arc line has a center point positioned on the tire equator line CL. In this case, the standard profile line PL0, preferably passes through the two side land portion edge points at which the side land portions 64 and 66 are connected with the outer circumferential main grooves 52 and 56. In many cases, the profile lines of the tread portion have a line-symmetric shape with respect to the tire equator line CL. In such case, the standard profile line PL0 passes through the two land portion edge points and the one side land portion edge point, positioned on both sides in the tire lateral direction. Also in this case, the standard profile line PL0 preferably passes through the two side land portion edge points at which the side land portions 64 and 66 are connected with the outer circumferential main grooves 52 and 56.

Note that the expression that the standard profile line PL0 passes through the two land portion edge points and the one side land portion edge point indicates a case where the standard profile line PL0 passes through locations slightly deviated from those points, in addition to a case where the standard profile line PL0 accurately passes through those points. In this case, an arc line with a minimum total of distances from each of the points to the arc line is preferably set as the standard profile line PL0. For example, in a case of the profile line with a line-symmetric shape with respect to the tire equator line CL, an arc line, which has a center point on the tire equator line CL and which has a radius with a minimum total of distances to the two land portion edge points and the one side land portion edge point positioned on both sides in the tire lateral direction, is preferably set as the standard profile line PL0.

Meanwhile, the swelling profile lines PL1 and PL2 are profile lines protruding outward of the standard profile line in the tire radial direction. Specifically, the profile lines of the intermediate land portions 60 and 62 protrude outward in the tire radial direction with respect to the standard profile line PL0 passing through the land portion edge points of each of the land portions, and the profile lines of the side land portions 64 and 66 protrude outward in the radial direction with respect to the standard profile line PL0 passing through the side land portion edge points of each of the land portions. Therefore, the swelling profile line PL1 protrudes outward in the tire radial direction from the two land portion edge points of each of the intermediate land portions 60 and 62 with respect to the standard profile line PL0. The swelling profile line PL2 protrudes outward in the tire radial direction from the one land portion edge point of each of the side land portions 64 and 66 with respect to the standard profile line PL0.

A maximum protrusion amount of the swelling profile lines PL1 and PL2 with respect to the standard profile line PL0 preferably falls within a range of, for example, from 0.1 mm to 1.0 mm. The maximum swelling amount is set to fall within a range of from 0.1 mm to 1.0 mm, and thus a ground contact pressure of center regions of the intermediate land portions 60 and 62 and the side land portions 64 and 66 can be effectively increased. Thus, the ground contact length can be increased.

The intermediate land portion 60 has a profile line formed of the swelling profile line PL1. As described above, in the region of the intermediate land portion 60, the sipe 60a and the sipe 60b in a peak-like shape protruding to one side in the tire circumferential direction are formed.

In this manner, the sipe 60a and the sipe 60b long enough to have a length that exert a high edge effect due to such peak-like shape are provided. However, block rigidity of the intermediate land portion 60 is degraded, which is disadvantageous in terms of steering stability. However, the profile line of the intermediate land portion 60 is set to the swelling profile line PL1, and hence a ground contact pressure of the intermediate land portion 60 is increased at the center part of the intermediate land portion 60 in the tire lateral direction. Thus, even when a slip angle is formed for the tire 10 during cornering and a pressure of an end of the intermediate land portion 60 on a cornering inner side in the tire lateral direction is lowered, the pressure at the center portion of the intermediate land portion 60 is still high. In this manner, ground contact of the intermediate land portion 60 can be ensured. In this respect, steering stability, which is likely to be degraded by degradation of block rigidity due to the sipe 60a and the sipe 60b, can be improved by increase in the ground contact pressure of the center part due to the swelling profile line PL1.

According to the embodiment, the protrusion ends of the peak-like shapes of the sipe turning portions 60a3 and 60b3 of the sipe 60a and the sipe 60b, which protrude most to the first side, are preferably present within a range of 70% of the width of the intermediate land portion 60 in the tire lateral direction, with the maximum swelling position of the swelling profile line PL1 in the tire lateral direction as a center. With this, the sipe turning portions of the sipe 60a and the sipe 60b are positioned at the center portions where the ground contact length of the intermediate land portion 60 is largest. Thus, an edge length of the sipe in contact with a road surface is increased. As a result, performance on snow can be improved due to increase of an edge effect of the sipe 60a and the sipe 60b.

In this case, the protrusion ends of the sipe turning portions 60a3 and 60b3 of the sipe 60a and the sipe 60b are preferably present inward in the tire lateral direction with respect to the maximum swelling position of the swelling profile line PL1 in the tire lateral direction. With this, the inclined sipe portions 60a1 and 60b1 that are inclined continuously in one direction are provided outward of the maximum swelling position of the swelling profile line PL1 in the tire lateral direction. Thus, when steering of the tire 10 is performed so that the intermediate land portion 60 is on the cornering outer side with respect to the tire equator line CL and thus a slip angle is formed, an edge effect of the inclined sipe portions 60a1 and 60b1 is exerted effectively, and handling (controllability) on snow-covered road surfaces is improved.

As described above, the intermediate land portion 60 is block land portions defined by the lug grooves 61 in the tire circumferential direction. In the region of each of the intermediate land portions 60, the two sipes 60a and 60b are provided. Thus, with the edges of the lug grooves 61 and the edges of the sipes 60a and 60b, performance on snow, particularly, braking and driving performance on snow-covered road surfaces is improved.

According to the embodiment, the protrusion end of the groove turning portion 61a2 of the lug groove 61, which protrudes to the first side in a peak-like shape, is preferably present within a range of 70% of the width of the intermediate land portion 60 in the tire lateral direction, with the maximum swelling position of the swelling profile line PL1 in the tire lateral direction as a center. With this, similarly to the sipe 60a and the sipe 60b, the groove turning portion 61a2 of the lug groove 61 is positioned at the center portion where the ground contact length of the intermediate land portion 60 is largest. Thus, an edge length of the lug groove 61 in contact with a road surface is increased. As a result, performance on snow can be improved due to increase of an edge effect of the lug groove 61.

In this case, the protrusion end of the groove turning portion 61a2 of the lug groove 60 is preferably present inward in the tire lateral direction with respect to the maximum swelling position of the swelling profile line PL1 in the tire lateral direction. With this, the inclined groove portion that is inclined continuously in one direction is provided outward of the maximum swelling position of the swelling profile line PL1 in the tire lateral direction. Thus, when steering of the tire 10 is performed so that the intermediate land portion 60 is on the cornering outer side with respect to the tire equator line CL and thus a slip angle is formed, an edge effect of the inclined groove portion is exerted effectively, and handling (controllability) on snow-covered road surfaces is improved.

Figure 4:
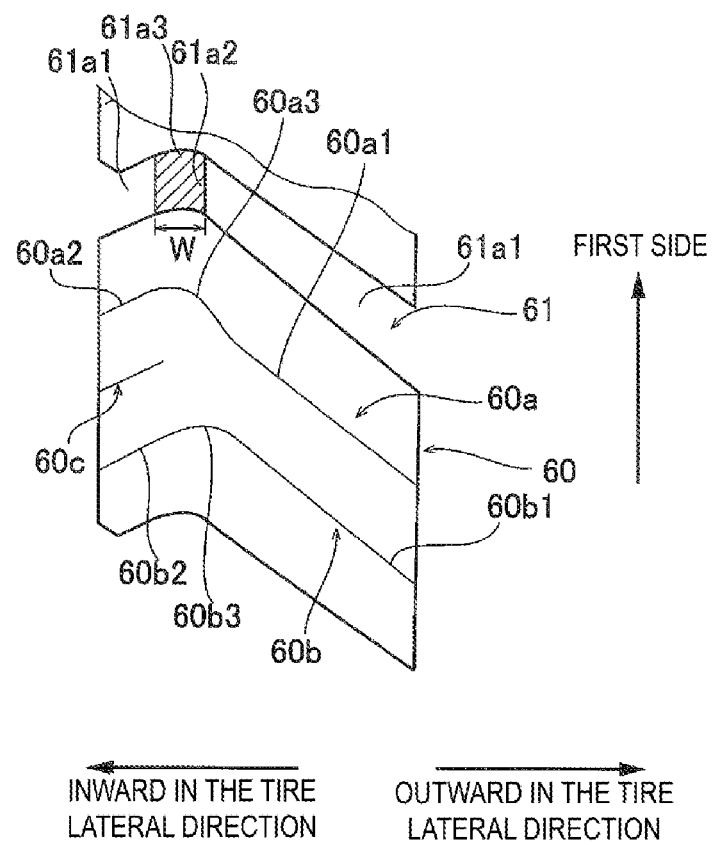
FIG. 4 is a detailed explanatory view of an intermediate land portion and a lug groove of an embodiment in an enlarged manner.

According to the embodiment, as illustrated in FIG. 4, the groove turning portion 61a2 of the lug groove 61 is prefer- ably provided with a raised groove bottom portion 61a3 (the hatched portion in FIG. 4) having a groove depth shallower than the groove depth of the inclined groove portion. FIG. 4 is a detailed explanatory view of the intermediate land portion 60 and the lug groove 61 of the embodiment in an enlarged manner. As illustrated in FIG. 4, the sipe 60a (the first sipe) is provided on the first side (upward in FIG. 4) of the sipe 60b (the second sipe). In this case, a first position of the protrusion end of the sipe turning portion 60a3 of the sipe 60a in the tire lateral direction, which protrudes most to the first side, is preferably present in a raised bottom portion range W in the tire lateral direction in which the raised groove bottom portion 61a3 is provided and is preferably present inward in the tire lateral direction with respect to a second position of the protrusion end of the sipe turning portion 60b3 of the sipe 60b, which protrudes most to the first side, in the tire lateral direction. The intermediate land portion 60 can improve performance on snow with an edge effect of the sipes 60a and 60b. Whereas, block rigidity of the intermediate land portion 60 is degraded when the sipes 60a and 60b are provided.

Particularly, the groove turning portion 61a2 of the lug groove 61 defining the intermediate land portion 60 in the tire circumferential direction is a part where strain is likely to be concentrated when the intermediate land portion 60 receives a lateral force or a longitudinal force from a road surface and is deformed and is a part that influences a magnitude of deformation of the intermediate land portion 60. Thus, the groove turning portion 61a2 is provided with the raised groove bottom portion 61a3, and thus block rigidity of the intermediate land portion 60 can be increased. Particularly, the sipe turning portion 60a3 of the sipe 60a is provided close to the raised groove bottom portion 61a3 of the lug groove 61. Specifically, the protrusion end of the sipe turning portion 60a3 is provided in the raised bottom portion range in which the raised groove bottom portion 61a3 of the lug groove 61 is provided in the tire lateral direction. Further, the protrusion end of the sipe turning portion 60a3 is provided inward in the tire lateral direction with respect to the position of the protrusion end of the sipe turning portion 60b3 of the sipe 60b in the tire lateral direction. With this, while exerting an edge effect of the sipe 60a, degradation of block rigidity of the intermediate land portion 60 can be suppressed. With this, steering stability and performance on snow can be improved.

According to the embodiment, in a region between the sipe 60a and the sipe 60b in the tire circumferential direction in the region of each of the intermediate land portions 60 being block land portions, the sipe 60c (the third sipe), which extends outward in the tire lateral direction from the inner circumferential main groove 50, is inclined with respect to the tire lateral direction, and has a terminal end in the raised bottom portion range in the tire lateral direction, is preferably provided in parallel with the inclined sipe portions 60a2 and 60b2 of the sipe 60a and the sipe 60b, which extend from the inner circumferential main groove 50. The position of the protrusion end of the sipe turning portion 60a3 of the sipe 60a and the position of the protrusion end of the sipe turning portion 60b3 of the sipe 60b are different from each other in the tire lateral direction. Thus, a space for providing the sipe 60c can be ensured easily in a part of the intermediate land portion 60, which is on a side close to the inner circumferential main groove 50. The sipe 60c can be provided, and an edge effect can be improved, which improves performance on snow.

As illustrated in FIG. 2, the sipes 64a and 64b (the sixths sipes) that are connected with the outer circumferential main groove 52 are provided in the region of the side land portion 64 provided outward of the outer circumferential main groove 52 in the tire lateral direction. The region includes the ground contact edge of the tire 10. According to the embodiment, all the sipes 60a, 60b, 64a, and 64b that are connected to the region of the intermediate land portion 60 and the region of the side land portion 64 are preferably formed of composite sipes. The composite sipe includes: a straight sipe having a shape linearly extending from the tread surface in the sipe depth direction; and a wave-like sipe that is bent or curved in a wave-like shape protruding in a direction orthogonal to the sipe depth direction and an extension direction extending along the tread surface of the sipe when advancing from the tread surface in the sipe depth direction. The composite sipe has a structure in which the straight sipe and the wave-like shape are connected while the straight sipe is provided on one side in the extension direction and the wave-like sipe is provided on the other side, as viewed from the tread surface of the sipes 60a, 60b, 64a, and 64b. In this case, according to the embodiment, all the parts of the sipes 60a, 60b, 64a, and 64b, which are connected with the outer circumferential main groove 52, are preferably wave-like sipes.

Further, in another embodiment, all the parts of the sipes 60a, 60b, 64a, and 64b, which are connected with the outer circumferential main groove 52, are the wave-like sipes in the composite sipes. In addition, the sipes 62a and 62b and the sipes 66a and 66b (the seventh sipes) are preferably formed of composite sipes, and all the parts of the sipes 62a, 62b, 66a, and 66b, which are connected with the outer circumferential main groove 56, are preferably wave-like sipes.

FIGS. 5A to 5E are explanatory views of embodiments of the composite sipe provided in the tread pattern of an embodiment. FIGS. 6A and 6B are explanatory views of embodiments of the sipes 60a, 60b, 60c, 62a, 62b, 64a, 64b, 66a, and 66b, which are taken along the depth direction.

Each of the sipes 60a, 60b, 60c, 62a, 62b, 64a, 64b, 66a, and 66b is a composite sipe in which a sipe S1 and a sipe S2 are connected with each other.

Here, as illustrated in FIG. 6A, the sipe S1 is a straight sipe having a shape extending linearly from the tread surface in the sipe depth direction. As illustrated in FIG. 6B, the sipe S2 is a wave-like sipe that is bent or curved in a wave-like shape protruding in the direction orthogonal to the sipe depth direction and the extension direction viewed from the tread surface when advancing from the tread surface in the sipe depth direction.

The sipe 58a provided in the region of the center land portion 58 is a sipe having a shape extending linearly from the tread surface in the depth direction, that is, the sipe S1.

Figure 5A:
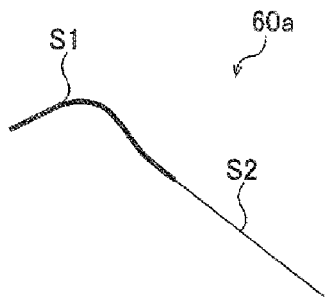
FIGS. 5A to 5E are explanatory views of embodiments of a composite sipe provided in the tread pattern of an embodiment.
Figure 5B:
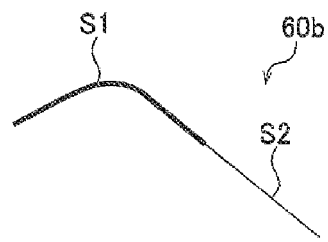
Figure 6A:
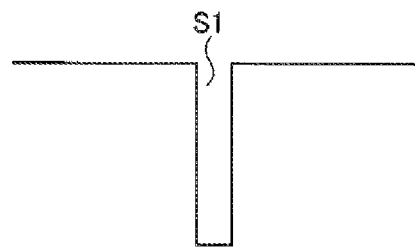
FIGS. 6A and 6B are explanatory views of embodiments of sipes of an embodiment, which are taken along a depth direction.
Figure 6B:
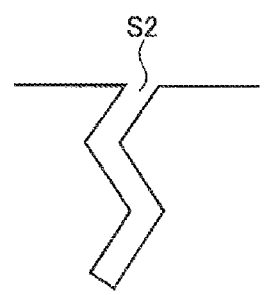

As apparent from FIG. 2 and FIGS. 5A and 5B, in each of the sipes 60a and 60b, the sipe S2 is provided on the side close to the outer circumferential main groove 52, and the sipe S1 is provided on the side close to the inner circumferential main groove 50. In each of the sipes 60a and 60b, a connection position of the sipe S1 and the sipe S2 is provided so that a top portion of the peak-like shape of each of the sipes 60a and 60b, which protrudes to one side in the tire circumferential direction, is the sipe S1.

Figure 5C:
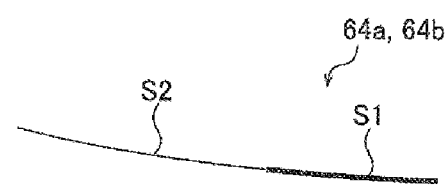

As apparent from FIG. 2 and FIG. 5C, in each of the sipes 64a and 64b, the sipe S2 is provided on the side close to the outer circumferential main groove 52, and the sipe S1 is provided on the side close to the pattern end E1.

Figure 5D:
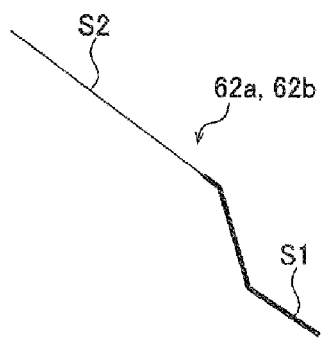

As apparent from FIG. 2 and FIG. 5D, in each of the sipes 62a and 62b, the sipe S2 is provided on the side close to the outer circumferential main groove 56, and the sipe S1 is provided on the side close to the inner circumferential main groove 54. In each of the sipes 62a and 62b, a connection position of the sipe S1 and the sipe S2 is provided so that the steep inclination part, which is inclined steeply with respect to the tire lateral direction, is the sipe S1.

Figure 5E:
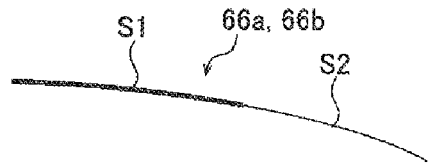

Further, as apparent from FIG. 2 and FIG. 5E, in each of the sipes 66a and 66b (the seventh sipes), the sipe S2 is provided on the side close to the outer circumferential main groove 56, and the sipe S1 is provided on the side close to the pattern end E2.

The intermediate land portion 60 and the side land portion 64, which are positioned on both sides of the outer circumferential main groove 52 in the tire lateral direction, and the intermediate land portion 62 and the side land portion 66, which are positioned on both sides of the outer circumferential main groove 56 in the tire lateral direction, are present outward of the center land portion 58 in the tire lateral direction and are parts that contribute to generation of a lateral force during cornering. Thus, tread rigidity of the parts is preferably high. Thus, in the parts on both sides of the outer circumferential main grooves 52 and 56 in the tire lateral direction, tread rigidity or block rigidity, which is likely to be degraded due to the sipes 60a, 60b, 64a, and 64b and the sipes 62a, 62b, 66a, and 66b, is preferably improved. All the parts of the sipes 60a, 60b, 64a, and 64b, which are connected with the outer circumferential main groove 52, and the parts of the sipes 62a, 62b, 66a, and 66b, which are connected with the outer circumferential main groove 56, are the wave-like sipes. With this, the wave-like sipes are engaged with each other, and tread rigidity or block rigidity can be improved.

Therefore, by disposing the wave-like sipes in the parts of the sipes 60a, 60b, 64a, and 64b, which are connected with the outer circumferential main groove 52, and the parts of the sipes 62a, 62b, 66a, and 66b, which are connected with the outer circumferential main groove 56, steering stability can be improved.

As described above, the non-through lug groove 63 that does not communicate with the inner circumferential main groove 54 is provided in the region of the intermediate land portion 62, and the continuous land portion is formed. With this, tread rigidity can be improved, and wear resistance can be improved. Whereas, when the sipes 62a and 62b including the steep inclination parts inside are provided, degradation of tread rigidity can be suppressed, and performance on snow can be improved.

Further, the non-through lug grooves 59a that do not communicate with the inner circumferential main groove 54 and the non-through lug grooves 59b that do not communicate with the inner circumferential main groove 50 are provided in the region of the center land portion 58, and the lug grooves 59a and 59b are provided alternately in the tire circumferential direction. With this, the continuous land portion with high tread rigidity is formed, which is advantageous in terms of wear resistance. Further, an edge effect of the lug grooves 59a and 59b can be exerted effectively in the continuous land portion, which improves performance on snow.

Note that the maximum groove depth of the center lug groove 59b is preferably shallower than the maximum groove depth of the center lug groove 59a. As illustrated in FIG. 2, in the tread pattern in the half tread region on the right side of the tire equator line CL, an edge effect is improved through use of the sipes and the lug grooves, which improves performance on snow. The maximum groove depth of the center lug groove 59a is deeper than the maximum groove depth of the center lug groove 59b. With this, much snow can be captured in the center lug groove 59*a*, and an edge effect can be improved. Thus, performance on snow can be improved.

According to the embodiment, the tire 10 is designated so that one side of both sides in the tire lateral direction corresponds to a vehicle outer side when the tire is mounted on a vehicle. This designation is displayed in information indicating a vehicle outer side or a vehicle inner side as a side pattern with alphanumerics, symbols, reference signs, or the like in the side portion 10S. In a case of the tread pattern illustrated in FIG. 2, a side of the half tread region on the right side of the tire equator line CL illustrated in FIG. 2 is preferably designated to be a vehicle outer side. In the half tread region on the right side of the tire equator line CL illustrated in FIG. 2, an edge effect is improved through use of the sipes and the lug grooves for the purpose of improving performance on snow. In the half tread region on the left side of the tire equator line CL illustrated in FIG. 2, the intermediate land portion 62 is provided as a continuous land portion for the purpose of improving wear resistance. A vehicle to which the tire is mounted is set to a negative camber in many cases. Thus, in consideration of the negative camber, for the purpose of improving wear resistance, the tire 10 is preferably mounted to a vehicle so that the half tread region on the left side in FIG. 2 is present on a vehicle inner side and so that the half tread region on the right side in FIG. 2 in which a ground contact surface is likely to be increased during cornering and braking and driving is present on a vehicle outer side.

In this case, a groove area ratio in the shoulder region including the side land portion 64 (the first side land portion) provided outward of the outer circumferential main groove 52 in the tire lateral direction, which is positioned on a vehicle outer side, is preferably smaller than a groove area ratio in the shoulder region including the side land portion 66 (the second side land portion) provided outward of the outer circumferential main groove 56 in the tire lateral direction. In the embodiment illustrated in FIG. 2, the lug groove 65 has: the groove width in the vicinity connected to the outer circumferential main groove 52, which is narrower than the groove width of the lug groove 67, and the groove width that is further narrower. With this, a difference between the groove area ratios is caused. The side land portions 64 with a small groove area ratio are disposed on the vehicle outer side, and thus block rigidity of the side land portion 64 is higher than the side land portion 66. Thus, steering stability can be improved.

EXAMPLES AND COMPARATIVE EXAMPLES

In order to confirm effects of the tire according to the embodiment, the tread pattern was variously changed, and steering stability and performance on snow (braking performance on snow and handling performance on snow) were evaluated.

Structures of produced tires (tire size: 265/50R20 111W) were set to the structure illustrated in FIG. 1. The produced tires were mounted to a rim (rim size: 20×8.5 J) (air pressure of 250 kPa). Further, the produced tires were mounted to a test vehicle (an SUV (sport utility vehicle) with engine displacement of 3.6 liter).

With regard to evaluation on steering stability, the test vehicle was caused to travel on a predetermined course of dry road surfaces, and sensory evaluation was given on a response of the test vehicle with respect to steering performed by a driver. For the sensory evaluation, the evaluation values of other Comparative Examples and Examples were indexed with the index of Comparative Example 1 as 100. A higher index indicates more superior steering stability.

With regard to evaluation on braking performance on snow, the test vehicle was caused to travel on a predetermined course of snow-covered road surfaces, and a braking distance was measured when full braking was performed from a speed of 30 km/h. As the measurement results, reciprocals of the braking distances of other Comparative Examples and Examples were indexed with a reciprocal of the braking distance of Comparative Example 1 as a reference. In this manner, braking performance on snow was evaluated. The index of Comparative Example 1 was 100. Thus, a higher index indicates superior braking performance on snow.

Further, with regard to handling performance on snow, the test vehicle was caused to travel on a predetermined course of snow-covered road surfaces, and sensory evaluation was given on a response of the test vehicle with respect to steering performed by a driver. For the sensory evaluation, the evaluation values of other Comparative Examples and Examples were also indexed with the index of Comparative Example 1 as 100. A higher index indicates superior handling performance on snow.

Tables 1 and 2 given below show variously changed specifications of the tread pattern and the evaluation results thereof, with the tread pattern illustrated in FIG. 2 as a reference. The tire 10 was mounted to a vehicle so that the right side of the tire equator line CL illustrated in FIG. 2 corresponded to the vehicle outer side.

Figure 7:
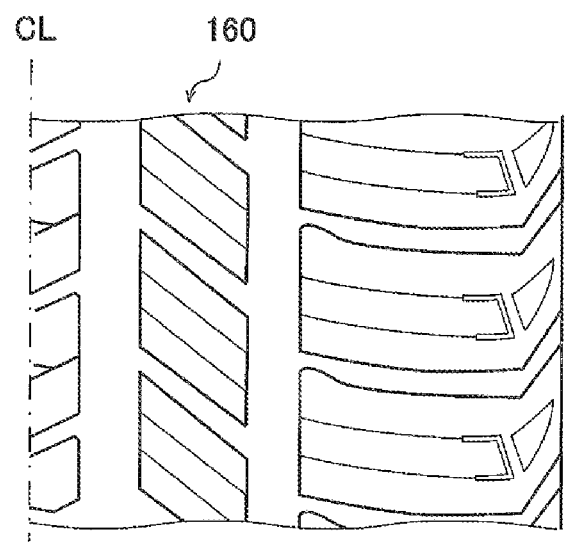
FIG. 7 is a view partially illustrating a tread pattern used in Comparative Examples 1 and 3.

"Presence of peak-like sipes and peak-like lug grooves" in Tables 1 and 2 indicates whether the peak-like sipes 60*a* and 60*b* and the peak-like lug grooves 61 illustrated in FIG. 2 were provided. In Comparative Examples 1 and 3 in which "presence of peak-like sipes and peak-like lug grooves" was "No", intermediate land portions 160 illustrated in FIG. 7 were used in place of the intermediate land portion 60 illustrated in FIG. 2, and sipes and lug grooves inclined in one direction were provided between an outer circumferential main groove and an inner circumferential main groove. FIG. 7 is a view partially illustrating a tread pattern used in Comparative Examples 1 and 3.

Further, "position from maximum swelling position to sipe protrusion end (%)" and "position from maximum swelling position to lug groove protrusion end (%)" in Tables 1 and 2 indicate ratios (%) obtained by dividing distances in the tire lateral direction from the maximum swelling position of the swelling profile line PL1 to the positions of the protrusion ends of the sipes 60*a* and 60*b* and the lug groove 61 by the width of the intermediate land portion 60 in the tire lateral direction. "Inward" indicates that the positions of the protrusion ends of the sipes 60*a* and 60*b* and the lug groove 61 were present inward of the maximum swelling position in the tire lateral direction, and "outward" indicates that the positions of the protrusion ends of the sipes 60*a* and 60*b* and the lug groove 61 were present outward of the maximum swelling position in the tire lateral direction.

Note that the maximum swelling amount of the swelling profile lines PL1 and PL2 with respect to the standard profile line PL0 was set to 0.2 mm.

The groove area ratio in the region of the side land portion 66 was set to 24%.

In Example 8 in Table 2, the groove width of the lug groove 65 was set equal to the groove width of the lug groove 67, and thus the groove area ratio in the region of the side land portion 64 was set equal to the groove area ratio in the region of the side land portion 66.

TABLE 1-1

|  | Comparative Example 1 | Comparative Example 2 | Comparative Example 3 |
|---|---|---|---|
| Presence of peak-like sipes and peak-like lug grooves | No | Yes | No |
| Presence of swelling profile lines PL1 and PL2 | No | No | Yes |
| Position from maximum swelling position to sipe protrusion end (%) | — | — | — |
| Position from maximum swelling position to lug groove protrusion end (%) | — | — | — |
| Whether groove area ratio in shoulder region on side close to side land portion 64 is smaller than groove area ratio in shoulder region on side close to side land portion 66. | Small | Small | Small |
| Handling performance on snow | 100 | 101 | 100 |
| Braking performance on snow | 100 | 101 | 100 |
| Steering stability on dry road surfaces | 100 | 100 | 102 |

TABLE 1-2

|  | Example 1 | Example 2 | Example 3 |
|---|---|---|---|
| Presence of peak-like sipes and peak-like lug grooves | Yes | Yes | Yes |
| Presence of swelling profile lines PL1 and PL2 | Yes | Yes | Yes |
| Position from maximum swelling position to sipe protrusion end (%) | Inward by 20% | Inward by 35% | Inward by 35% |
| Position from maximum swelling position to lug groove protrusion end (%) | Inward by 10% | Inward by 25% | Inward by 35% |
| Whether groove area ratio in shoulder region on side close to side land portion 64 is smaller than groove area ratio in shoulder region on side close to side land portion 66. | Small | Small | Small |
| Handling performance on snow | 105 | 104 | 103 |
| Braking performance on snow | 105 | 104 | 103 |
| Steering stability on dry road surfaces | 103 | 103 | 102 |

TABLE 2

|  | Example 4 | Example 5 | Example 6 | Example 7 | Example 8 |
|---|---|---|---|---|---|
| Presence of peak-like sipes and peak-like lug grooves | Yes | Yes | Yes | Yes | Yes |
| Presence of swelling profile lines PL1 and PL2 | Yes | Yes | Yes | Yes | Yes |
| Position from maximum swelling position to sipe protrusion end (%) | Inward by 40% | Outward by 20% | Outward by 35% | Outward by 40% | Inward by 20% |
| Position from maximum swelling position to lug groove protrusion end (%) | Inward by 40% | Outward by 20% | Outward by 35% | Outward by 40% | Inward by 10% |
| Whether groove area ratio in shoulder region on side close to side land portion 64 is smaller than groove area ratio in shoulder region on side close to side land portion 66. | Small | Small | Small | Small | No (equivalent groove area ratio) |
| Handling performance on snow | 102 | 104 | 103 | 102 | 105 |
| Braking performance on snow | 102 | 103 | 102 | 101 | 105 |
| Steering stability on dry road surfaces | 102 | 102 | 102 | 102 | 102 |

From Comparative Examples 1 to 3 and Example 1 to 8, it can be understood that handling performance on snow, braking performance on snow, and steering stability on dry road surfaces are improved by providing the peak-like sipes and lug grooves in the intermediate land portion 60 and setting the profile line of the intermediate land portion 60 to the swelling profile line.

From Examples 1 to 7, it can be understood that handling performance on snow and braking performance on snow are improved by providing the protrusion end of the peak-like sipe within the range of 70% of the width of the intermediate land portion 60 in the tire lateral direction, with the maximum swelling position of the swelling profile line PL1 as a center. Further, it can be understood that at least one of handling performance on snow and braking performance on snow is improved by providing the protrusion end of the sipe inward of the maximum swelling position of the swelling profile line PL1 in the tire lateral direction.

From Examples 1 and 8, it can be understood that steering stability on dry road surfaces is improved by setting the groove area ratio in the shoulder region on the side of the side land portion 64, which is mounted on the vehicle outer side, to be smaller than the groove area ratio in the shoulder region including the side land portion 66. Which is mounted on the vehicle inner side.

While the pneumatic tire according to the present technology is described above in detail, the present technology is not limited to the above embodiment and Examples and may be improved or modified in various ways within a range without departing from the essence of the present technology as a matter of course.

The invention claimed is:
1. A pneumatic tire comprising a tread portion that is provided with a tread pattern, the tread pattern comprising:
a pair of circumferential main grooves comprising an inner circumferential main groove being provided in a first half tread region on one side with respect to a tire equator line in a tire lateral direction and an outer circumferential main groove being provided outward of the inner circumferential main groove in the tire lateral direction;
a land portion being defined by the pair of circumferential main grooves in the tire lateral direction; and a plurality of sipes provided at an interval in a tire circumferential direction, the plurality of sipes being provided in a region of the land portion and connecting the pair of circumferential main grooves with each other, each of the plurality of sipes comprising:

a pair of inclined sipe portions approaching each other while advancing from connection ends of the pair of circumferential main grooves to a first side in the tire circumferential direction; and a sipe turning portion connecting ends of the pair of inclined sipe portions with each other and being bent to protrude to the first side, and a profile line formed by a tread surface of the land portion being a swelling profile line protruding outward of a standard profile line in a tire radial direction, when an arc passing through two land portion edge points at which the tread surface of the land portion is connected with groove wall surfaces of the pair of circumferential main grooves is set to the standard profile line, in a profile cross-section of the tread portion taken along the tire lateral direction, wherein when the inner circumferential main groove is a first inner circumferential main groove, and the outer circumferential main groove is a first outer circumferential main groove, a second half tread region on a side opposite to the first half tread region in the tire lateral direction comprises:

a second inner circumferential main groove;

a second outer circumferential main groove being provided outward of the second inner circumferential main groove in the tire lateral direction;

a continuous land portion being defined by the second inner circumferential main groove and the second outer circumferential main groove and present around a circumference in the tire circumferential direction; and a fourth sipe and a fifth sipe connecting the second inner circumferential main groove and the second outer circumferential main groove with each other, the fourth sipe and the fifth sipe extending to be inclined with respect to the tire lateral direction in a region of the continuous land portion, each of the fourth sipe and the fifth sipe comprises:

an inner inclined portion provided in a region of the continuous land portion; and both side inclined portions being provided on both sides of the inner inclined portion in the tire lateral direction and being connected with the second inner circumferential main groove and the second outer circumferential main groove, and an inclination angle of the inner inclined portion with respect to the tire lateral direction is larger than an inclination angle of both the side inclined portions with respect to the tire lateral direction.

2. The pneumatic tire according to claim 1, wherein a protrusion end of the sipe turning portion, which protrudes most to the first side, is present within a range of 70% of a width of the land portion in the tire lateral direction, with a maximum swelling position of the swelling profile line as a center.

3. The pneumatic tire according to claim 1, wherein a protrusion end of the sipe turning portion, which protrudes most to the first side, is present inward of a maximum swelling position of the swelling profile line in the tire lateral direction.

4. The pneumatic tire according to claim 1, wherein the tread pattern comprises a plurality of lug grooves provided at an interval in the tire circumferential direction, the plurality of lug grooves connecting the pair of circumferential main grooves with each other, each of the plurality of lug grooves comprises:

a pair of inclined groove portions approaching each other while advancing from connection ends of the pair of circumferential main grooves to the first side in the tire circumferential direction; and a groove turning portion connecting ends of the pair of inclined groove portions with each other and being bent to protrude to the first side in the tire circumferential direction, the land portion is formed of a plurality of block land portions divided by the plurality of lug grooves in the tire circumferential direction, and in a region of each of the plurality of block land portions, two of the plurality of sipes are provided as a first sipe and a second sipe.

5. The pneumatic tire according to claim 4, wherein a protrusion end of the groove turning portion, which protrudes most to the first side, is present within a range of 70% of a width of the land portion in the tire lateral direction, with a maximum swelling position of the swelling profile line as a center.

6. The pneumatic tire according to claim 4, wherein a protrusion end of the groove turning portion, which protrudes most to the first side, is present inward of a maximum swelling position of the swelling profile line in the tire lateral direction.

7. The pneumatic tire according to claim 4, wherein the groove turning portion is provided with a raised groove bottom portion having a groove depth shallower than a groove depth of the pair of inclined groove portions, the first sipe is provided on the first side relative to the second sipe, and a first position of a protrusion end of the sipe turning portion of the first sipe in the tire lateral direction, which protrudes most to the first side, is present in a raised bottom portion range in the tire lateral direction in which the raised groove bottom portion is provided and is present inward in the tire lateral direction relative to a second position of a protrusion end of the sipe turning portion of the second sipe in the tire lateral direction, which protrudes most to the first side.

8. The pneumatic tire according to claim 4, wherein when the land portion is a first intermediate land portion, the tread pattern further comprises a first side land portion outward of the outer circumferential main groove in the tire lateral direction, the first side land portion comprising a ground contact edge of the pneumatic tire in a region, a region of the first side land portion is provided with a sixth sipe connected with the outer circumferential main groove, each of the first sipe, the second sipe, and the sixth sipe is a composite sipe comprising:

a straight sipe having a shape extending linearly from the tread surface in a sipe depth direction; and a wave-like sipe being bent or curved to protrude in a direction orthogonal to the sipe depth direction and an extension direction in which each of the first sipe, the second sipe, and the sixth sipe extends along the tread surface, when advancing from the tread surface in the sipe depth direction, the straight sipe is provided on one side in a sipe extension direction viewed from the tread surface, and the wave-like sipe is provided on an other side in the sipe extension direction, the straight sipe and the wave-like sipe are connected in the composite sipe, and each of parts of the first sipe, the second sipe, and the sixth sipe, which are connected with the outer circumferential main groove, is the wave-like sipe.

9. The pneumatic tire according to claim 1, wherein a maximum protruding amount of the swelling profile line with respect to the standard profile line falls within a range of from 0.1 mm to 1.0 mm.

10. The pneumatic tire according to claim 1, wherein when the continuous land portion is a second intermediate land portion, the tread pattern further comprises a second side land portion being provided outward of the second outer circumferential main groove in the tire lateral direction, the second side land portion comprising a ground contact edge of the pneumatic tire in a region thereof, a region of the second side land portion is provided with a seventh sipe connected with the second outer circumferential main groove, each of the fourth sipe, the fifth sipe, and the seventh sipe is a composite sipe comprising:

a straight sipe having a shape extending linearly from the tread surface in a sipe depth direction; and a wave-like sipe being bent or curved to protrude in a direction orthogonal to the sipe depth direction and an extension direction in which each of the fourth sipe, the fifth sipe, and the seventh sipe extends along the tread surface, when advancing from the tread surface in the sipe depth direction, the straight sipe is provided on one side in the extension direction, and the wave-like sipe is provided on an other side in the extension direction, the straight sipe and the wave-like sipe are connected in the composite sipe, and each of parts of the fourth sipe, the fifth sipe, and the seventh sipe, which are connected with the second outer circumferential main groove, is the wave-like sipe.

11. The pneumatic tire according to claim 1, wherein when the inner circumferential main groove is a first inner circumferential main groove, and the outer circumferential main groove is a first outer circumferential main groove, in the tread pattern, a second half tread region on a side opposite to the first half tread region in the tire lateral direction comprises:

a second inner circumferential main groove;

a second outer circumferential main groove being provided outward of the second inner circumferential main groove in the tire lateral direction;

a center continuous land portion being defined by the first inner circumferential main groove and the second inner circumferential main groove and present around a circumference in the tire circumferential direction;

a plurality of first center lug grooves being provided at an interval in the tire circumferential direction, the plurality of first center lug grooves extending inward in the tire lateral direction from the first inner circumferential main groove and being terminated in a region of the center continuous land portion; and a plurality of second center lug grooves being provided at an interval in the tire circumferential direction, the plurality of second center lug grooves extending inward in the tire lateral direction from the second inner circumferential main groove and being terminated in a region of the center continuous land portion, any one of the plurality of second center lug grooves is provided in a region in the tire circumferential direction between two first center lug grooves adjacent to each other in the tire circumferential direction among the plurality of first center lug grooves, and any one of the plurality of first center lug grooves is provided in a region in the tire circumferential direction between two second center lug grooves adjacent to each other in the tire circumferential direction among the plurality of second center lug grooves.

12. The pneumatic tire according to claim 11, wherein a maximum groove depth of the plurality of second center lug grooves is shallower than a maximum groove depth of the plurality of first center lug grooves.

13. The pneumatic tire according to claim 1, wherein the pneumatic tire comprises information displaying a tire mounting direction such that one side of both sides in the tire lateral direction is designated as a vehicle outer side when the pneumatic tire is mounted to a vehicle.

14. The pneumatic tire according to claim 13, wherein a shoulder lug groove is provided outward of the outer circumferential main groove in the first half tread region in the tire lateral direction, the tread pattern comprises, in a second half tread region on a side opposite to the first half tread region in the tire lateral direction, a second inner circumferential main groove;

a second outer circumferential main groove being provided outward of the second inner circumferential main groove in the tire lateral direction; and a shoulder lug groove provided outward of the second outer circumferential main groove in the tire lateral direction, and a groove area ratio in a region outward of the outer circumferential main groove in the first half tread region in the tire lateral direction is smaller than a groove area ratio in a region outward of the second outer circumferential main groove in the tire lateral direction.

15. A pneumatic tire comprising a tread portion that is provided with a tread pattern, the tread pattern comprising:

a pair of circumferential main grooves comprising an inner circumferential main groove being provided in a first half tread region on one side with respect to a tire equator line in a tire lateral direction and an outer circumferential main groove being provided outward of the inner circumferential main groove in the tire lateral direction;

a land portion being defined by the pair of circumferential main grooves in the tire lateral direction; and a plurality of sipes provided at an interval in a tire circumferential direction, the plurality of sipes being provided in a region of the land portion and connecting the pair of circumferential main grooves with each other, each of the plurality of sipes comprising:

a pair of inclined sipe portions approaching each other while advancing from connection ends of the pair of circumferential main grooves to a first side in the tire circumferential direction; and a sipe turning portion connecting ends of the pair of inclined sipe portions with each other and being bent to protrude to the first side, and a profile line formed by a tread surface of the land portion being a swelling profile line protruding outward of a standard profile line in a tire radial direction, when an arc passing through two land portion edge points at which the tread surface of the land portion is connected with groove wall surfaces of the pair of circumferential main grooves is set to the standard profile line, in a profile cross-section of the tread portion taken along the tire lateral direction, wherein the tread pattern comprises a plurality of lug grooves provided at an interval in the tire circumferential direction, the plurality of lug grooves connecting the pair of circumferential main grooves with each other, each of the plurality of lug grooves comprises:

a pair of inclined groove portions approaching each other while advancing from connection ends of the pair of circumferential main grooves to the first side in the tire circumferential direction; and a groove turning portion connecting ends of the pair of inclined groove portions with each other and being bent to protrude to the first side in the tire circumferential direction, the land portion is formed of a plurality of block land portions divided by the plurality of lug grooves in the tire circumferential direction, and in a region of each of the plurality of block land portions, two of the plurality of sipes are provided as a first sipe and a second sipe, the groove turning portion is provided with a raised groove bottom portion having a groove depth shallower than a groove depth of the pair of inclined groove portions, the first sipe is provided on the first side relative to the second sipe, and a first position of a protrusion end of the sipe turning portion of the first sipe in the tire lateral direction, which protrudes most to the first side, is present in a raised bottom portion range in the tire lateral direction in which the raised groove bottom portion is provided and is present inward in the tire lateral direction relative to a second position of a protrusion end of the sipe turning portion of the second sipe in the tire lateral direction, which protrudes most to the first side, in the region of each of the plurality of block land portions, a region between the first sipe and the second sipe in the tire circumferential direction is provided with a third sipe having a terminal end in the raised bottom portion range in the tire lateral direction, the third sipe extending, at an inclination with respect to the tire lateral direction, outward in the tire lateral direction from the inner circumferential main groove, along at least one of the pair of inclined sipe portions of the first sipe and the second sipe extending from the inner circumferential main groove.

\* \* \* \* \*